(12) United States Patent
Skopnik

(10) Patent No.: US 9,033,634 B2
(45) Date of Patent: May 19, 2015

(54) HEIGHT-ADJUSTABLE ROUND ROD GUIDE

(71) Applicant: EMKA Beschlagteile GmbH & Co. KG, Velbert (DE)

(72) Inventor: Joerg Skopnik, Hattingen (DE)

(73) Assignee: EMKA BESCHLAGTEILE GMBY & CO., KG, Belbert (DE)

( * ) Notice: Subject to any disclaimer, the term of this patent is extended or adjusted under 35 U.S.C. 154(b) by 0 days.

(21) Appl. No.: 14/180,200

(22) Filed: Feb. 13, 2014

(65) Prior Publication Data

US 2014/0314524 A1 Oct. 23, 2014

(51) Int. Cl.
 F16B 37/16 (2006.01)
 E05C 9/22 (2006.01)
 F16B 37/00 (2006.01)
 F16B 37/08 (2006.01)

(52) U.S. Cl.
 CPC . *F16B 37/00* (2013.01); *E05C 9/22* (2013.01); *F16B 37/0814* (2013.01)

(58) Field of Classification Search
 USPC ............. 411/433, 427, 437; 248/68.1, 74.1, 248/74.4, 74.5, 286.1, 287.1, 292.14; 403/59, 83, 84, 200
 IPC ............. F16B 7/044,17/004; F16L 13/085
 See application file for complete search history.

(56) References Cited

U.S. PATENT DOCUMENTS

| | | | | |
|---|---|---|---|---|
| 4,301,767 A | * | 11/1981 | Willinger et al. | 119/245 |
| 4,368,997 A | * | 1/1983 | Shemtov | 403/59 |
| 4,865,484 A | * | 9/1989 | McConnell | 403/59 |
| 5,351,920 A | * | 10/1994 | Decky et al. | 248/73 |
| 5,558,481 A | * | 9/1996 | Park | 411/433 |
| 5,944,467 A | * | 8/1999 | Yuta | 411/433 |
| 6,886,852 B2 | * | 5/2005 | Cheng et al. | 280/651 |
| 7,432,449 B2 | * | 10/2008 | Kim | 174/138 F |
| 7,651,057 B2 | * | 1/2010 | Sedivy et al. | 248/68.1 |
| 2009/0127412 A1 | * | 5/2009 | Kleege | 248/214 |

\* cited by examiner

*Primary Examiner* — Gary Estremsky
(74) *Attorney, Agent, or Firm* — Jennifer S. Stachniak; Robert W. Becker

(57) ABSTRACT

A round rod guide (10) for mounting a stud bolt attached to a container side includes a plastic body, the stud bolt shaft (30) of the stud bolt being insertable onto and attachable to the plastic body. The plastic body has in its interior a channel (35) for receiving the stud bolt shaft (30) and on its free end, a receiving opening (19) for insertion of a round rod. The plastic body is formed as two parts with a first, cup-shaped base part (11) and with a second insertion part (16) insertable into the cup-shaped base part (11) in at least two different insertion positions that are rotated relative to one another at a predetermined angle. The receiving opening (19) for the round rod and the channel (35) for receiving the stud bolt shaft (30) and for attaching the round rod guide (10) are formed on the insertion part (16), whereby the receiving opening (10) formed in the insertion part (16), when the insertion part (16) is inserted in the base part (11) in the first insertion position, has a different spacing to the foot of the stud bolt shaft (30) than when in the second insertion position.

5 Claims, 3 Drawing Sheets

HEIGHT-ADJUSTABLE ROUND ROD GUIDE

The instant application should be granted the priority day of Feb. 14, 2013, the filing date of the corresponding German patent application DE 10 2013 101 491.7.

BACKGROUND OF THE INVENTION

The invention relates to a round rod guide for mounting to a stud bolt disposed on a container side with a plastic body that can be plugged into it and secured thereon, which has a channel in its interior for receiving the stud bolt shaft and a receiving opening on its free end for feeding through of a round rod.

A round rod guide with the above-mentioned features is known from DE 20 2005 015 135 U1. The round rod guide comprises a plastic block, which can be screwed or locked onto a stud bolt shaft mounted in a channel formed in the plastic block, the stud bolt shaft being provided with an outer thread and the stud bolt shaft being mounted to a container or an electrical cabinet, preferably to its door, whereby in the channel of the plastic block, a metal part that creates the connection with the stud bolt shaft can be inserted. At its free end, the plastic block has a receiving opening for receiving a round rod therethrough.

A disadvantage, however, is connected with the known round rod guide, in that the receiving opening for the round rod with the rod guide mounted on the stud bolt shaft is disposed at the same distance, respectively, from the foot of the stud bolt shaft and therefore from the container part supporting it, so that for different distances of the extension of the round rod to the plane of the container part supporting the round rod, as in particular of the door leaf, differently formed rod guides also must be provided and installed.

SUMMARY OF THE INVENTION

The present invention, therefore, is based on the object of forming a round rod guide with the above-noted features, such that the uniform round rod guide is disposed for the adjustment of at least two different distances of the receiving opening for the round rod to the foot of the stud bolt shaft.

The solution for this object is provided, including advantageous embodiments of the invention, in the content of the patent claims, which follow this description.

The present invention contemplates in its basic idea that the plastic body is formed as two pieces with a first, cup-shaped base part and with a second insertion part that is insertable into the cup-shaped base part in at least two different insertion positions that are rotated relative to one another, respectively, at a predetermined angle, and the receiving opening for the round rod as well as the channel for receiving the stud bolt shaft and for attachment of the round rod guide thereto are formed on the insertion part, whereby the receiving opening formed in the insertion part, when the insertion part is inserted in the base part in the first insertion position, has a different distance to the foot of the stud bolt shaft than in the second insertion position. Thus, the present invention relates to the basic principle that, despite the unitary formation of the two parts of the round rod guide, by means of a different insertion into one another of the parts, respectively, also a different position of the receiving opening for the round rod formed on the insertion part is adjustable relative to the cup-shaped base part. Since the channel for receiving the stud bolt shaft and the means for attaching the round rod guide to the stud bolt shaft, respectively are formed on the insertion part, by means of the insertion part attached to the stud bolt shaft, also the cup-shaped base, into which the insertion part is received, is fixed to the container part, so that on the base part, no further devices for attaching the round rod guide are necessary.

In this connection, it can be provided that the first cup-shaped base part has on its upper edge at least two window-like cut-outs that are opposite disposed to one another for lockingly receiving projecting portions formed on the second insertion part, respectively, in the first insertion position, whereby in the second insertion position, which is rotated at an angle of 90 degrees to the first insertion position, the portions formed on the second insertion part rest on the upper edge of the first cup-shaped base part. In the frame of such a formation of both parts of the rod guide, the insertion part dips in a first insertion position completely into the cup-shaped base part, so that a minimal height of the round rod guide is provided. In the second insertion position that is offset at 90 degrees, the insertion part can extend only into the cup-shaped base part until reaching an insertion position determined by the contact of the portions formed on it onto the upper edge of the cup-shaped base part, so that a corresponding larger height of the rod guide is provided.

In addition, it can be provided that in the interior of the cup-shaped base part, inwardly projecting guide rails, which serve as anti-rotation devices, are provided that are received in a form-locking manner recesses formed on the outer periphery of the insertion part.

The guide acting between the insertion part and the cup-shaped part ensure that the two insertion positions are exactly defined and also provide that, in the assembled state of the round rod guides, no rotation of the base parts relative to one another is possible.

A further problem with the known rod guide relates to the mounting of the rod guide on the stud bolt of the container. In so far as the rod guide can be screwed onto the stud bolt shaft by forming corresponding threading on the stud bolt shaft and the rod guide, first a greater number of rotations are necessary, which is costly. In so far as the stud bolts having an outer threading are frequently provided with a paint coating, screwing on of the rod guide body can be made more difficult. This is true, in particular, for metal part placed in the body of the rod guide that is in the form of a nut with threading formed thereon. In so far as it is also known to lock a rod guide onto the stud bolt, the threading of the stud bolt shaft can be coated with paint, such that the pull-off forces of the rod guide from the stud bolt are reduced, so that the risk exists that with a corresponding load of the round rod guided in the rod guide in its transverse direction, the rod guide is loosened from the stud bolt.

Thus, according to an exemplary embodiment of the invention, it is further provided that in the insertion part, two oppositely disposed semicircular wall regions of the wall surrounding the channel that are offset to one another in the axial direction of the channel extending from the floor of the insertion part are provided, the wall regions having an inner thread adapted to an outer thread formed on the stud bolt shaft, whereby a first lower wall region connects to a floor surface and the wall region of the channel that is opposite to this lower wall region is provided with a clearance that is arranged at an angle of inclination relative to the longitudinal axis of the channel, such that an opening formed in the floor of the insertion part is formed as a slot for receiving the stud bolt shaft and enables insertion of the round rod guide onto the stud bolt shaft in a position that is tipped relative to the angle of elevation of the clearance. This offers the advantage of a simple, quick assembly, in which the round rod guide is positional in the tipped position provided therefore with its slot-like opening formed in the floor onto the stud bolt shaft and after tipping the round rod guide into its attachment position with the longitudinal axes of the stud bolt shaft and the channel being flush, it is only necessary to perform a correspondingly short rotation, in order to bring the respective threading of the insertion part and the stud bolt shaft into opposing engagement.

In order to facilitate any additional rotation of the round rod guide on the stud bolt shaft in the frame of mounting, it can be provided that the cup-shaped base part is provided on its outer periphery with a ribbing or crimping.

BRIEF DESCRIPTION OF THE DRAWINGS

In the drawings, an exemplary embodiment of the invention is provided, which is will be described in greater detail below. In the figures.

DETAILED DESCRIPTION OF SPECIFIC EMBODIMENTS

Figure 1A:
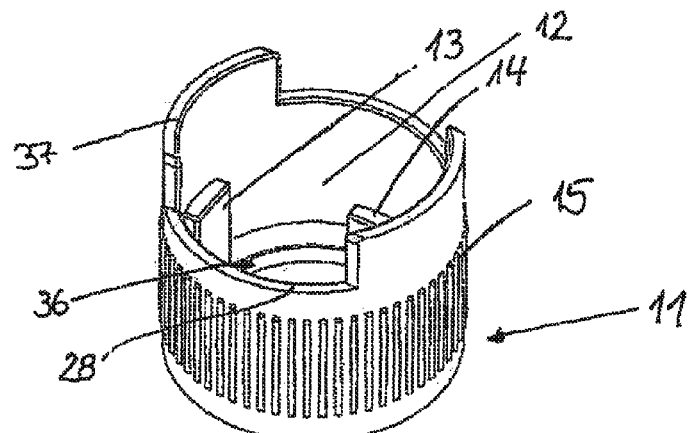
FIG. 1a shows the cup-shaped base part of a two-part rod guide for a round rod in a perspective view.
Figure 1B:
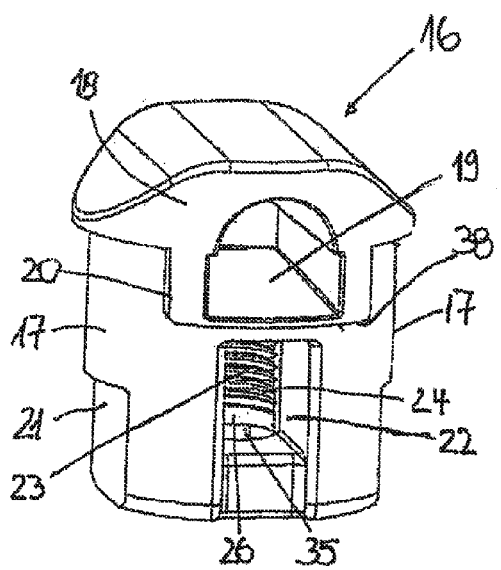
FIG. 1b shows the associated insertion part of the round rod guide in a first perspective representation.
Figure 1C:
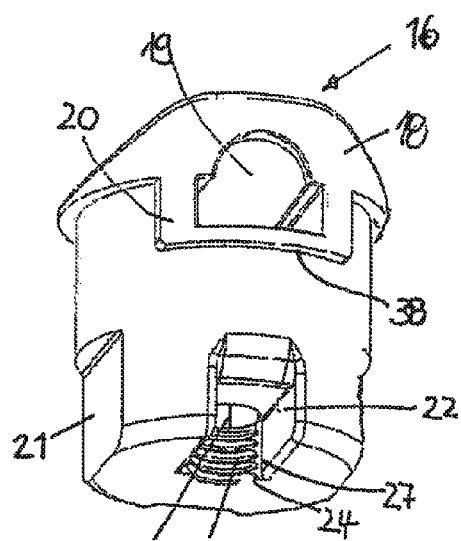
FIG. 1c shows the insertion part according to FIG. 1b in a rear view rotated at 180° in a perspective vie corresponding to FIG. 1b.

The round rod guide 10 according to the present invention comprises the individual parts shown in FIG. 1a, on the one hand, and in FIGS. 1b and 1c, on the other hand, namely, the cup-shaped base part 11 shown in FIG. 1a and the insertion part 16 inserted into the cup-shaped base part 11 shown in FIG. 1b or 1c.

The cup-shaped base part 11 shown in FIG. 1a has a interior 12 for receiving the insertion part 16 that is insertable therein, whereby guide rails 13 and 14 that project into the interior 12 are disposed on the inner side of the wall of the cup-shaped base part 11, the guide rails being disposed opposite one another, respectively, in pairs. Thus, the guide rails 13 have a greater extension over the height of the base part 11 than the guide rails 14. In the upper edge 37 of the wall of the cup-shaped base part 11, two window-like sections 35 disposed opposite to one another are arranged, which respectively form an upper edge 28. In addition, the cup-shaped base part 11 is provided on its outer periphery with a corrugation or ribbing 15, which is to facilitate rotation of the rod guide 10 during mounting.

The insertion part 16 shown in FIG. 1b or 1d has an insertion region 17 for insertion into the interior 12 of the cup-shaped base part 11 and on its upper region, a head 18, in which a receiving opening 19 is formed for the round rod (not further shown) to be guided by the rod guide 10.

Portions 20 extending over a part of the insertion region 17 and projecting over the periphery of the insertion region 17 with a lower retaining edge 38 are formed on the head 18 of the insertion part 16. The portions 20 are arranged in the exemplary embodiment that is shown such that the receiving opening 19 for the round rod (not shown) extends partially through the portions 20 disposed opposite to one another. The sections 20 are dimensioned and shaped, such that the portions 20 correspond with cut-outs 36 formed in the top edge 37 of the cup-shaped base part 11.

Furthermore, oppositely disposed flat portions 21 are formed on the outer periphery of the insertion region 17 of the insertion part 16, which act as recesses for receiving either the guide rails 13 or the guide rails 14, depending on the insertion position of the insertion part 16 in the cup-shaped base part 11. In a displaced arrangement disposed at 90°, further groove-like cut-ins 22 are formed as corresponding recesses for receiving the other respective guide rails 13 or 14 in the insertion region 17 of the insertion part 16, which have an additional function, which will be described below, during mounting of the round rod guide 10 onto the stud bolt of a container (see FIGS. 2, 3).

As shown in the overall view of FIGS. 1b and 1c, offset, semi-circular wall regions of the wall surrounding the channel 35 are provided in the insertion part 16 that are disposed opposite to one another and extend in the axial direction of the channel 35 originating from the floor of the insertion part 16. The wall regions are provided with inner threads 24 adapted to outer threads 31 formed on the stud bolt shaft 30.

As provided in FIG. 1c, a first lower wall region 25 provided with inner threads 24 connects to the floor surface of the insertion part 16, whereby, according to the representation in FIG. 1b, this is provided opposite to an upper wall region 23, likewise provided with inner threads 24, displaced with regard to the axial direction of the channel 35. Both wall regions 23 and 25 together surround the stud bolt shaft 30 provided with outer threads 31 and form together a type of screw nut formed in the interior of the insertion part 16 for attaching the insertion part 16 to the stud bolt shaft 30.

Figure 2:
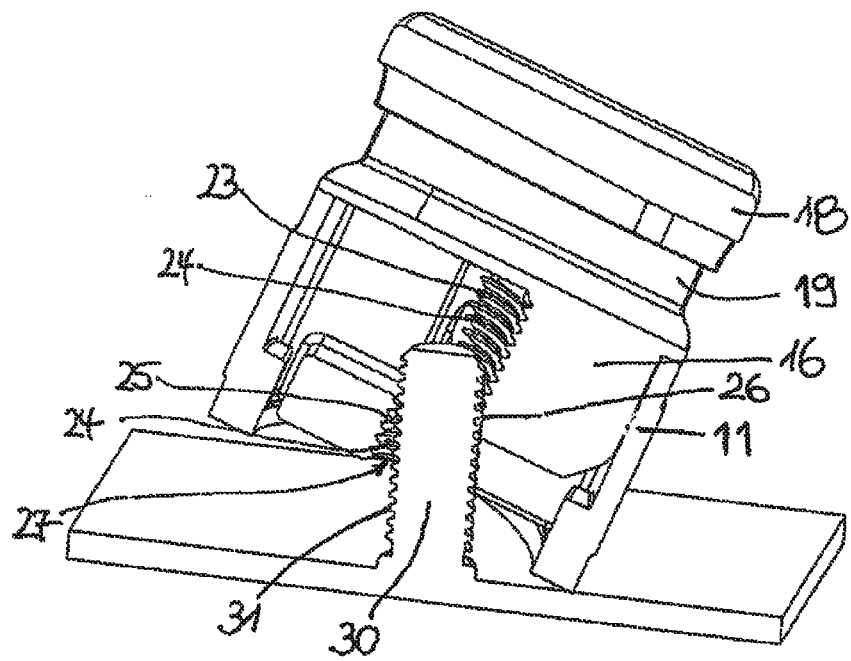
FIG. 2 shows the assembled round rod guide in an intermediate mounting position provided during attachment to the stud bolt in a sectional view.
Figure 3:
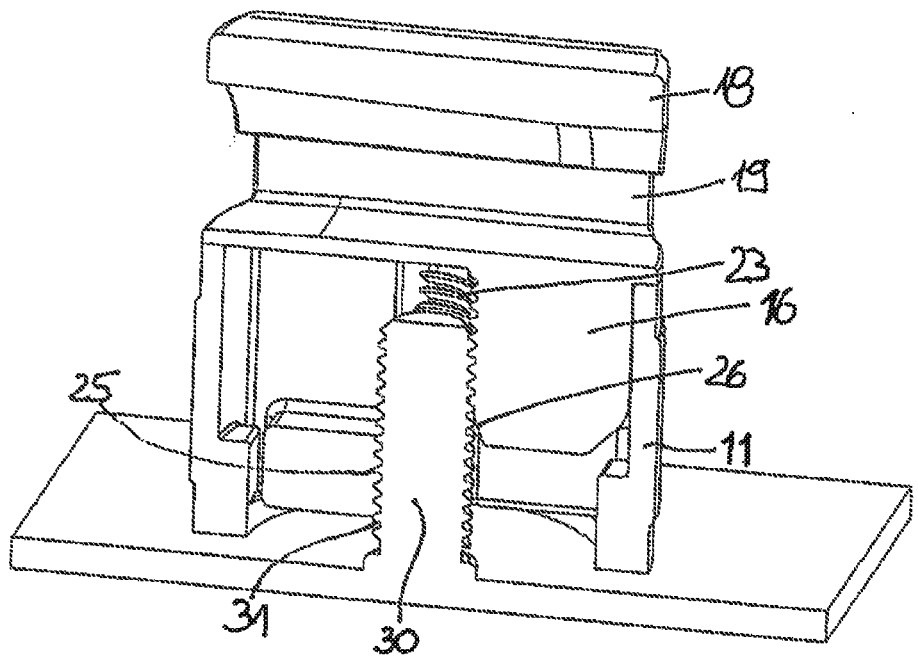
FIG. 3 shows the round rod guide according to FIG. 2 in its end mounting position.

For facilitating assembly, as can be seen from FIGS. 2 and 3, the lower wall region 25 connecting to the floor surface opposite wall region 26 of the channel 35 is provided with a clearance disposed with an angle of inclination, for example approximately 20 degrees, relative to the longitudinal axis of the channel 35, such that the opening 27 formed in the bottom of the insertion part 16 is formed to receive the stud bolt shaft has essentially a slot shape. In this manner, insertion of the round rod guide 10 onto the stud bolt shaft 30 in an inclined or tipped position at an angle of inclination of approximately 20° is possible, as shown in FIG. 2. In this position, the respective inner threads 24 of the two wall regions 23 and 25 no longer are engaged with the outer threads 31 of the stud bolt shaft 30, so that the rod guide 10 is insertable onto the stud bolt shaft. As can be seen from the combined view of FIGS. 2 and 3, after insertion of the rod guide 10 onto the stud bolt shaft 30 in the inclined or tipped position shown in FIG. 2, the rod guide 10 is tipped in its functional position, in which the floor surface of the rod guide 10 lies on the surface of the associated part of the container supporting the stud bolt shaft 30. In this position, merely a rotation of the rod guide 10 by engagement of the cup-shaped base part 11 on its periphery may be performed, which is provided with the corrugation or ribbing 15, in order to mount the rod guide 10 securely onto the stud bolt shaft by executing one to two rotations.

Figure 4:
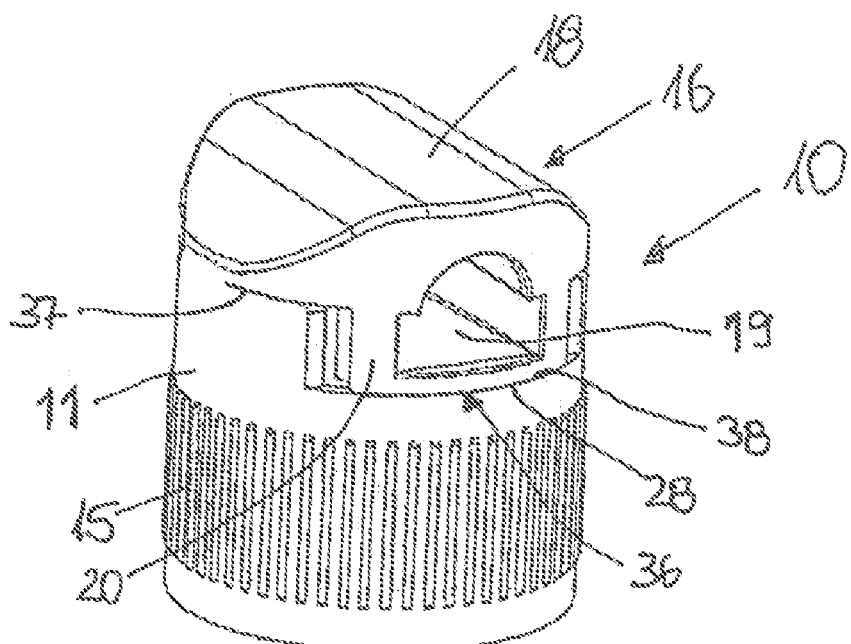
FIG. 4 shows the round rod guide according to FIGS. 1a and 1b with parts inserted into one another in a first insertion position in a perspective representation.
Figure 5:
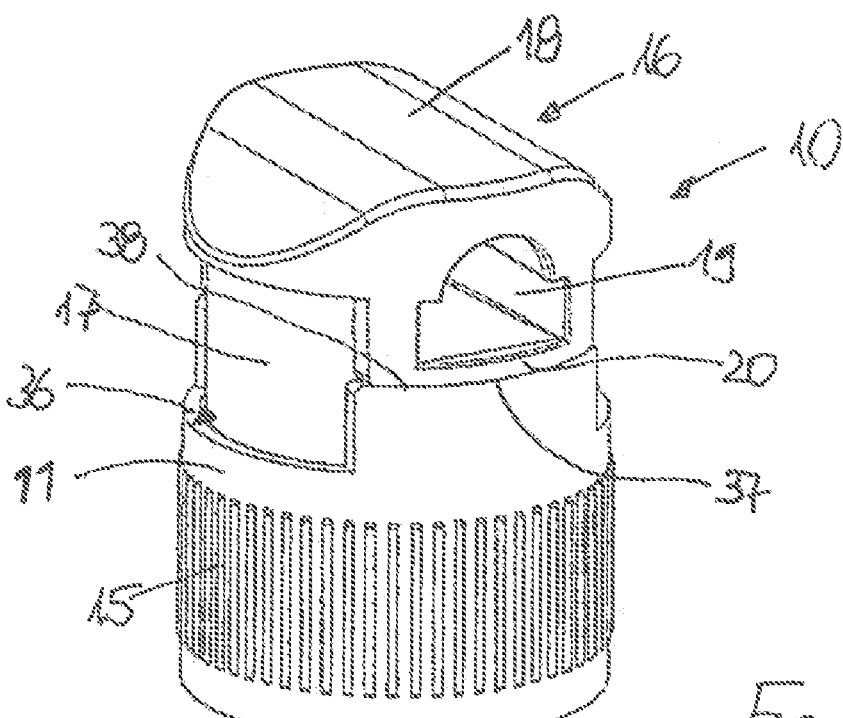
FIG. 5 shows the round rod guide according to FIGS. 1a and 1b with parts inserted into one another in a second insertion position in a perspective representation.

The two different insertion positions for forming different heights of the rod guide 10 are provided in FIGS. 4 and 5. In the first insertion position shown in FIG. 4, the insertion part 16 is inserted into a position in relation to the cup-shaped base part 11, in which the portions 20 formed on the insertion part 16 enter into the cut outs 36 in the upper edge 37 of the cup-shaped base part 11. Accordingly, the lower contact edges 38 formed on the portions 20 of the insertion part 16 contact the upper edge 28 of the window-like cut-outs 36 formed in the cup-shaped base part 11. In this first insertion position, the minimal height of the rod guide 10 is adjusted, because the insertion part 16 with is insertion region 17 is received completely in the interior 12 of the cup-shaped base part 11 and the receiving opening 19 of the insertion part 16 lies in the region of the cut-out 36 of the cup-shaped base part 11.

The second insertion position with a corresponding greater height of the rod guide 10 is shown in FIG. 5; here, it can be seen that the insertion part 16 is inserted into the cup-shaped base part 11 with a position that is rotated at 90° relative to the position shown in FIG. 4, whereby the insertion region 17 of the insertion part 16 is received only up to a partial area of its extension in the interior 12 of the cup-shaped base part 11 and the portions 20 formed on the insertion part 16 rests with its lower contact edges 38 on the upper edge 37 of the cup-shaped base part 11. In this case, the receiving opening 19 for the round rod (not shown) lies outside of the cup-shaped base part 11.

The features of the subject matter of this disclosure that are disclosed in the foregoing description, the patent claims, the abstract and the drawings are important individually as well as in any combination for realization of the present invention in its various embodiments.

The specification incorporates by reference the disclosure of German patent application DE 10 2013 101 491.7 filed Feb. 14, 2013.

The present invention is, of course, in no way restricted to the specific disclosure of the specification and drawings, but also encompasses any modifications within the scope of the appended claims.

The invention claimed is:

1. A round rod guide (10) for mounting a stud bolt attached to a container side, comprising:
  a plastic body, wherein a stud bolt shaft (30) of the stud bolt is insertable onto and attachable to the plastic body, wherein said plastic body has in an interior a channel (35) for receiving the stud bolt shaft (30) and on a free end, a receiving opening (19) for insertion of a round rod,
  wherein the plastic body is formed as two parts comprising a first cup-shaped base part (11) and a second insertion part (16) insertable into the cup-shaped base part (11) in at least two different insertion positions that are rotated relative to one another at a predetermined angle, and wherein the receiving opening (19) for the round rod and the channel (35) for receiving the stud bolt shaft (30) and for attaching the round rod guide (10) are formed on the insertion part (16), wherein when the insertion part (16) is inserted in the base part (11) in the first insertion position, the receiving opening (10) formed in the insertion part (16) has a different spacing to the foot of the stud bolt shaft (30) than when in the second insertion position.

2. The round rod guide according to claim 1, further comprising projecting portions (20) formed on the second insertion part (16), wherein the first cup-shaped base part (11) has at least two oppositely disposed window-like cut-outs (36) on an upper edge (37) for form-locking receipt in the first insertion position, respectively, of said projecting portions (20) formed on the second insertion part (16), wherein in the second insertion position rotated at an angle of 90° relative to the first insertion position, the portions (20) formed on the second insertion part (16) rest on an upper edge (37) of the first cup-shaped base part (11).

3. The round rod guide according to claim 2, further comprising inwardly projecting guide rails (14, 15) formed in the interior (12) of the cup-shaped base part (100), wherein said inwardly projecting guide rails (14, 15) cooperate in a form-locking manner with recesses (21, 22) formed on the outer periphery of the insertion part (16) to operate as an anti-rotation device.

4. The round rod guide according to claim 1, wherein the insert part (16) is provided with two oppositely disposed semicircular wall regions (23, 25) of a wall surrounding the channel (35), wherein said wall regions (23, 25) are offset to one another in an axial direction of the channel (35) originating from a floor of the insertion part, the wall regions having an inner thread (24) adapted to an outer thread (31) formed on the stud bolt shaft (30), whereby a first lower wall region (25) connects to a floor surface, and a wall region (26) of the channel (35) that is opposite to this lower wall region (25) is provided with a clearance that is arranged at an angle of inclination relative to a longitudinal axis of the channel (35), wherein an opening formed in the floor of the insertion part (16) is formed as a slot for receiving the stud bolt shaft (30) and enables insertion of the round rod guide (10) onto the stud bolt shaft (30) in a position that is tipped relative to the angle of inclination of the clearance.

5. The round rod guide according to claim 1, wherein the cup-shaped base part (11) is provided on an outer periphery with a ribbing (15).

* * * * *